Dec. 7, 1926.
G. T. EVANS
STEERING GEAR TIGHTENER
Filed Sept. 23, 1925
1,609,804
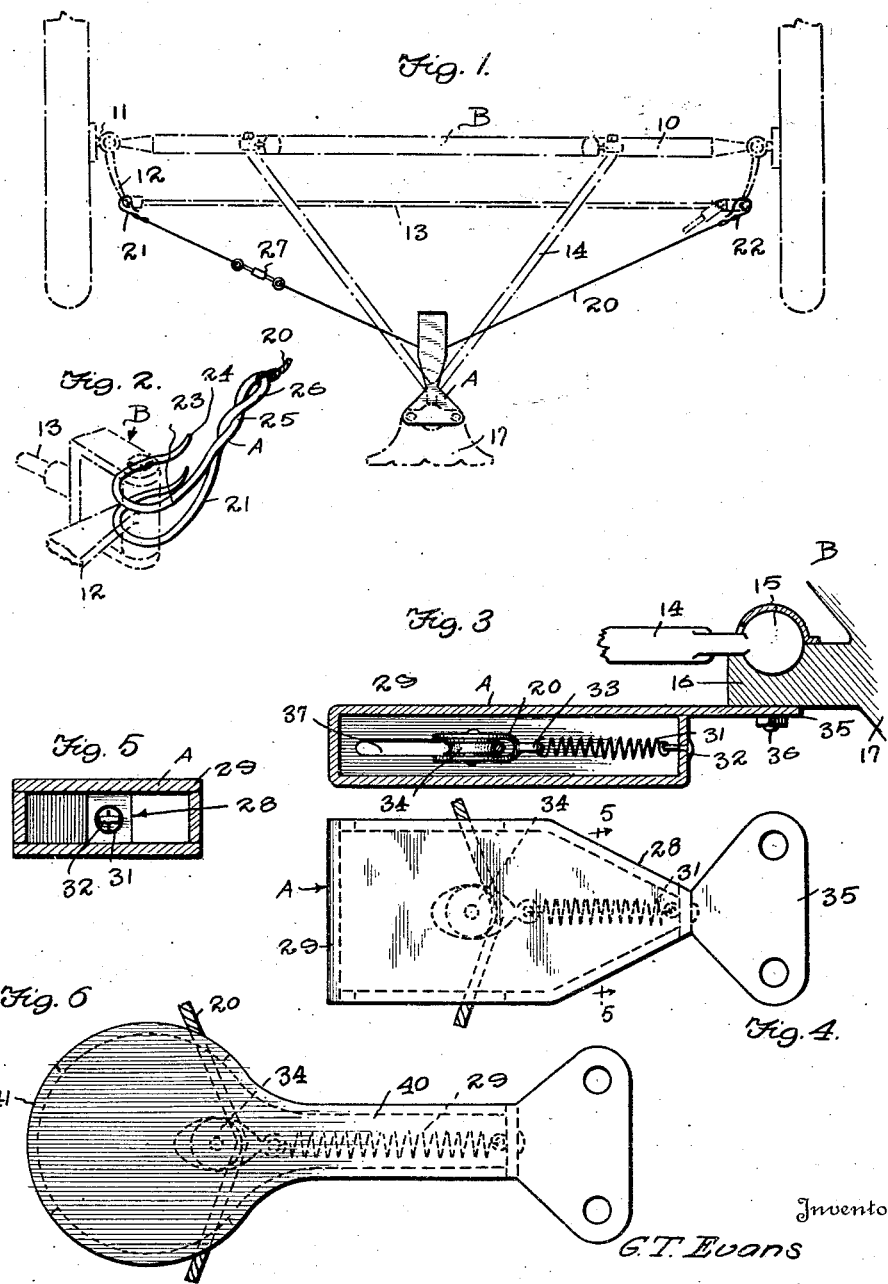

Patented Dec. 7, 1926.

1,609,804

UNITED STATES PATENT OFFICE.

GID T. EVANS, OF TIPTON, INDIANA.

STEERING-GEAR TIGHTENER.

Application filed September 23, 1925. Serial No. 58,208.

This invention relates to a novel attachment for steering gears of motor vehicles and the primary object of the invention is to provide means for holding the conventional steering gear against rattling and to eliminate all lost motion and to facilitate the steering of the vehicle.

Another object of the invention is to provide a steering gear tightener for normally maintaining a continuous pressure on the steering arms of the wheel spindles to eliminate rattling and lost motion, the attachment being so constructed as to conpensate for the turning of the wheels incident to the steering operation.

A further object of the invention is to provide a novel steering attachment for motor vehicles, of the above character, which will be durable and efficient in use, one that will be simple and easy to manufacture, and one which can be placed upon the market at a reasonable cost and incorporated with a conventional vehicle without change thereto.

With these and other objects in view, the invention consists in the novel construction, arrangement and formation of parts, as will be hereinafter more specifically described, claimed, and illustrated in the accompanying drawings, in which drawings:

Figure 1 is a plan view of the improved steering gear tightener showing the same applied to a motor vehicle, Figure 2 is a detail perspective view showing the novel hook utilized for connection with one of the steering arms, the hook being shown applied, Figure 3 is a longitudinal sectional view through the take up for the tightener showing the same connected with the crank case of an automobile, Figure 4 is a plan view of the said take up device for the tightener, Figure 5 is a transverse section through the protecting housing taken on the line 5—5 of Figure 4 looking in the direction of the arrows, Figure 6 is a plan view showing a slightly modified form of protecting housing.

Referring to the drawings in detail, wherein similar reference characters designate corresponding parts throughout the several views, the letter A generally indicates the improved steering gear tightener, for an automobile B.

The automobile B is of the conventional type, and only a sufficient portion thereof has been shown to illustrate the use of the improved device. As shown the vehicle B includes the front dead axle 10 carrying the wheel spindles 11 on which are formed the rearwardly extending steering arms 12 connected together by the conventional connecting steering rod 13. The dead axle 10 is braced in the ordinary manner by the radius rods 14, the inner ends of which terminate in the ball head 15 for connection with the radius rod connecting lug 16 formed on the crank case 17.

The improved steering gear tightener A comprises a connecting cable 20 formed of any desired material, such as wire or rope. The terminals of the cable 20 have connected thereto hooks 21 and 22 respectively for connection with the terminals of the steering arms 12 at the point of connection of the arms with the connecting rod 13. The hooks 22 are each preferably formed of single strands of wire of the desired guage and embody the arcuate spaced prongs 23 which terminate in bills 24 for engaging the steering arms 12 on each side of the connecting rod 13. The shanks of the hooks 21 and 22 are twisted together as at 25 so as to form an eye 26 to which the terminals of the cable 20 can be readily connected. A suitable turn buckle 27 can be incorporated in the length of the cable 20 to take up any slack which might appear therein.

In order to exert a continuous pressure on the steering arms 12 I provide a novel spring take up 28, which embodies a protector housing 29 formed of sheet metal or the like, in which is received a relatively heavy contractile coil spring 31. The terminals of the coil spring 31 are connected respectively to an eye bolt 32 and an eye 33 carried by the inner end of a guide pulley 34. The eye bolt is carried by the rear wall of the housing 29. The read end of the housing 29 is provided with a flat attaching plate 35, which is connected by means of a bolt 36 with the radius rod attaching lug 16, as clearly shown in Figure 4 of the drawings. The forward end of the housing has the side walls thereof provided with guide slots 37 through which extends the cable 20. The cable 20 is trained about the idle pulley 34 and it is obvious that the spring 31 will create a continuous pull on the cable 20, thus holding the steering arms 12 taut, eliminating all rattling and lost motion. The device will also facilitate steering of the vehicle and eliminate shocks and jars generally transmitted to the steering wheel incident to the travelling over a rough road way. The arrangement of the spring takeup 28 is such that breakage is precluded and the spring is protected from road grit and the like. The provision of the pulley 34 allows free movement of the cable 20 incident to the steering operation and allows the pull to be exerted on the cable at all times irrespective of the position of the steering arms 12.

In Figure 6 a slightly modified form of the protecting housing for the pulley and spring is shown and it can be seen that this housing includes a relatively narrow body portion 40 in which is disposed the spring 28 and a substantially disk-shaped head portion 41 in which is disposed the pulley 34. The side walls of the head 41 are provided with suitable slots through which the cable 20 extends and it can be seen that the pulley 34 is permitted free movement within the enlarged head.

From the foregoing description, it can be seen that I have provided a novel steering wheel tightener which can be easily applied to a conventional type of automobile without change thereto and which will be exceptionally durable and efficient in use.

Changes in details may be made without departing from the spirit or the scope of the invention, but:

What I claim as new is:—

1. The combination with an automobile including a chassis, a dead axle, steering wheel spindles carried by the terminals of the dead axle, inwardly extending steering arms connected with the spindles, a connecting rod for said steering arms, a crank case, a radius rod receiving socket formed on the crank case, of an attachment for the vehicle embodying a housing, a contractile coil spring arranged within the housing having one terminal connected to the inner end of the housing, means connecting the rear end of the housing to the socket, an anti-friction element carried by the forward end of the spring arranged in the housing, a cable trained about the anti-friction element extending through the housing, and hooks carried by the terminals of the cable for engaging the steering arms at the point of connection of said arms with the connecting rod.

2. The combination with a vehicle including a chassis, a front dead axle, steering wheel spindles supported by the axle, rearwardly extending steering arms connected with said wheel spindles, a connecting rod for said arms, a crank case, of a steering gear tightener attachment for the vehicle embodying a protector housing including a hollow body and a connecting lug, a contractile coil spring fitted within the housing, means for anchoring one terminal of the spring to the inner end of the housing, means for rigidly connecting the lug to the crank case, a guide pulley disposed in the housing carried by the forward end of the spring, a cable trained about said pulley extending through the side walls of the housing, hooks carried by the terminals of the cable for engaging the steering arms at the point of connection of the arms with the connecting rod, and a take up in said cable.

In testimony whereof I affix my signature.

GID T. EVANS